United States Patent [19]

Moore

[11] Patent Number: 4,852,257

[45] Date of Patent: Aug. 1, 1989

[54] SKILL SAW RIP GUIDE

[76] Inventor: Kenneth D. Moore, P.O. Box 1494, Columbus, Ga. 31902

[21] Appl. No.: 123,559

[22] Filed: Nov. 20, 1987

[51] Int. Cl.$^4$ .............................................. B23D 47/02
[52] U.S. Cl. ....................................... 30/373; 83/468; 83/522; 83/745
[58] Field of Search .................... 30/373, 371; 83/743, 83/745, 821, 829, 522, 761, 471.2, 468, 574

[56] References Cited

U.S. PATENT DOCUMENTS

| | | | |
|---|---|---|---|
| 1,700,189 | 1/1929 | Wikstrom | 83/829 X |
| 3,043,351 | 7/1962 | Davis | 30/373 |
| 3,273,613 | 9/1966 | Craven, Jr. | 83/745 X |
| 3,807,269 | 4/1974 | Mertes | 83/468 |
| 3,827,326 | 8/1974 | Martin | 83/468 |
| 4,031,794 | 6/1977 | Leihgeber | 83/829 |
| 4,557,170 | 12/1985 | Ingham | 83/468 |

Primary Examiner—Frank T. Yost
Assistant Examiner—Eugenia A. Jones
Attorney, Agent, or Firm—Richard C. Litman

[57] ABSTRACT

A hand held circular saw rip guide that is attached to a planar base and includes a movable cross member that is disposed about the planar base. An cross member extension serves as a straight-edge to guide the skill saw in operation. An upper surface of the planar base has a graduated series of indicia that represents feet and inches, or any suitable scale, to provide the operator with a tool for measuring the work piece and in combination with the movable cross member allows the operator to measure and cut any desired dimension in the work piece.

5 Claims, 2 Drawing Sheets

SKILL SAW RIP GUIDE

FIELD OF INVENTION

This invention relates to a means for utilizing skill saws more efficiently and productively and, more particularly to provide a device for guiding the saw and measuring work to achieve greater proficiency in the use of the saw and greater economy through less material wastage.

BACKGROUND OF THE INVENTION

Hand held power saws, such as skill saws are used extensively in all construction trades and a variety of cuts are made in a typical working days. Skill saws are especially adapted to work on lumber and flat stock such as plywood. In the instance of cutting a sheet of plywood it is necessary for the operator to use a straight edge, either a chalk line or other means, to mark off the line to be cut. Then, after marking the line, it is necessary to align the blade of the saw on the line and cut the line true and straight.

As sawdust builds on the work piece the operator must stop occasionally, blow the dust of the work piece, examine the progress made in the cut and continue, if on line, or restart the cut if off the mark.

The present invention relates to a guide apparatus for use with skill saws that enables the operator to establish the width of a cut beforehand and allows the guide to insure that a straight cut is maintained along the work piece.

This skill saw rip guide also relates to a means for measuring the length of a cut, having an integral rule deployed thereon that is readily visible to the operator and instantly ready for use as it is a part of the base of the apparatus.

Further, this skill saw rip guide stabilizes the skill saw, providing a basis for not only guiding same but assisting the operator in controlling the saw in the process of making a cut.

DESCRIPTION OF THE PRIOR ART

Various prior art saw guide devices, as well as their apparatuses and method construction in general are known and found to be exemplary of the U.S. prior art. They are:

| U.S. Pat. No. | Inventor |
| --- | --- |
| 3,210 | Norcross |
| 789,005 | Conkey, et al |
| 2,860,014 | Short |
| 3,918,334 | Wilcox |
| 3,961,548 | Classen |
| 4,050,340 | Flanders |
| 4,306,479 | Eberhardt |

U.S. Pat. No. 3,210, issued to Norcross, discloses an improvement on a mill saw guide for sawing lumber.

U.S. Pat. No. 4,050,340, issued to Flanders, discloses a power tool track that can be adapted to an existing tool, like an electric circular saw to be able to saw either straight or angular cuts in wood.

U.S. Pat. No. 4,306,479, to Eberhardt, teaches the construction of a portable guide for a power driven cutting tool. It consists of a guide member to be placed on a work piece, and a tool guiding edge. The remaining patents teach and disclose various types of guide devices; but none of them, whether taken singly or in combination, disclose the specific details of the present invention in any way so as to bear upon the claims as appended hereto.

SUMMARY OF THE INVENTION

An object of the invention is to provide a novel device that lends itself to being attached to a hand held circular saw that includes a base number for stabilizing same during use.

Another object, is to provide a device that allows the cutting of accurate, straight-edged cuts using a circular saw and a means for easily controlling the saw as it moves along the cut.

Another object is to provide a skill saw guide that is lightweight, durable and provides the operator with a proper distribution of weight and balance in use so as to enhance the speed and the accuracy of cut.

A further object is to provide built-in means for measuring an intended cut without resort to accessory rules and straight-edges.

DESCRIPTION OF THE PREFERRED EMBODIMENT

Figure 1:
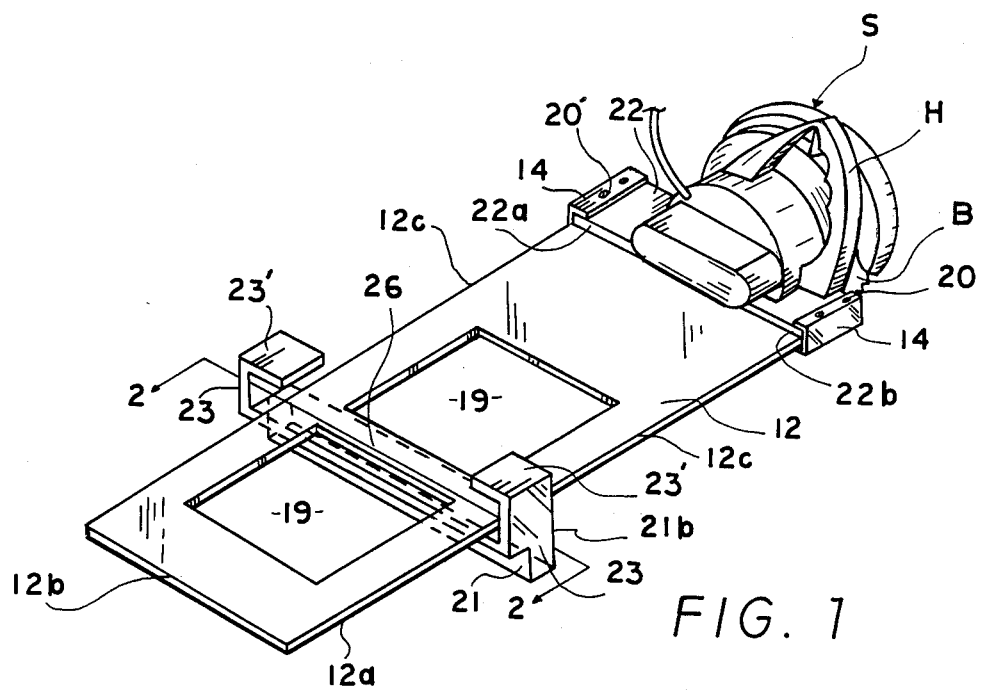
FIG. 1 is a perspective view of the skill saw rig guide.
Figure 4:
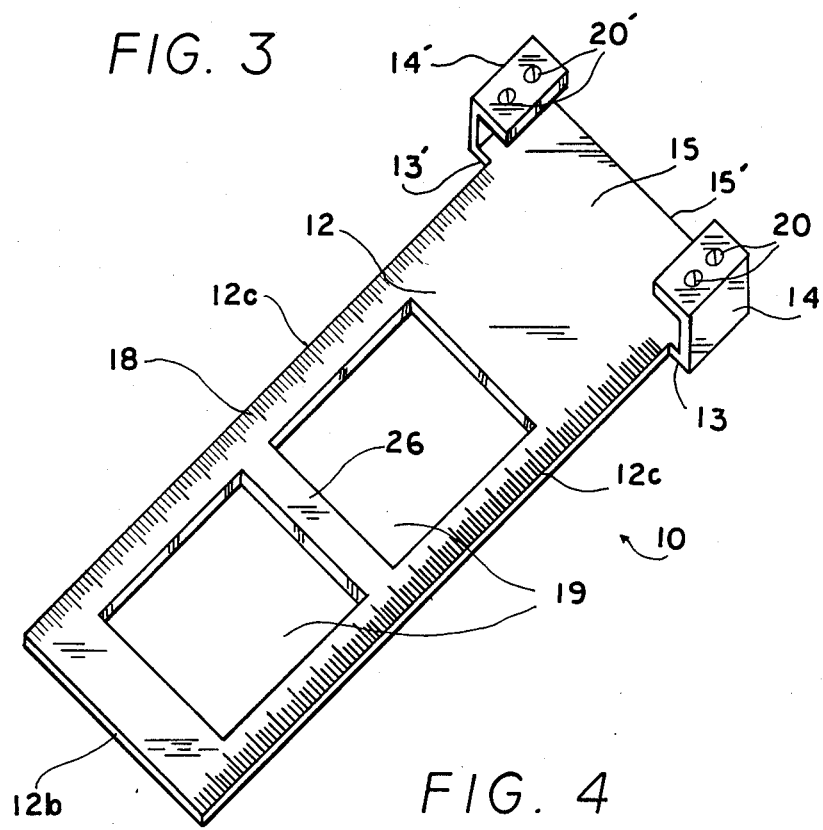
FIG. 4 is a perspective view illustrating the graduated indicia deployed on an upper surface of the skill saw rip guide for measuring the length of intended work.

Referring now to the figures in which like numerals refer to like elements throughout, FIGS. 1 and 4 illustrate a skill saw rip guide apparatus 10 that is seen to include an elongated planar base or arm 12 having T-extensions 13, 13' adjacent an edge 15 and saw retention means 14, 14' overlaying said extensions so that a planar skill saw base 22 is held or gripped therein. Saw base 22 includes front and rear edges 22a, 22b secured by any suitable adjustable securing or fastening means 20, 20' such as a pair of threaded bolts.

Retention means 14, 14' are L-shaped brackets that are either separately attached to the expanded end 15 of plate 12, as seen in FIG. 1; or are integrally constructed to said base 12, as seen in FIG. 4, so as to mate with a base 22 of a skill saw.

Figure 2:
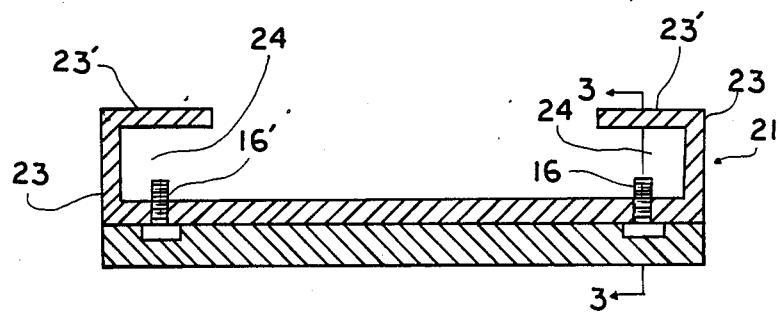
FIG. 2 is a sectional view taken along 2—2 of FIG. 1.
Figure 3:
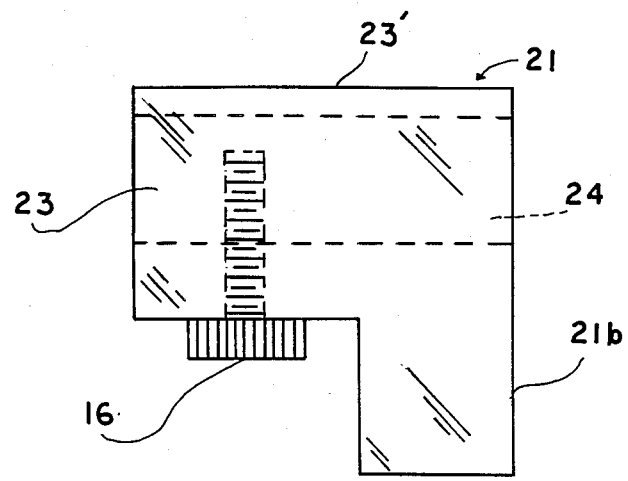
FIG. 3 is another sectional view showing the detail of a fastening means, the view taken along 3—3 of FIG. 2.

A movable cross member guide fence 21, shown in FIGS. 1-3, is disposed transversely under planar base 12 and has a length substantially equal to the width of planar base 12. Located on either end of guide fence 21 are mounting means comprising upwardly and inwardly directed arms 23, 23' respectively and which will be seen to define a pair of opposed, inwardly directed channels 24—24 which, combined with the fence bottom wall 21a, provide means for slidably mounting the guide fence 21 upon the arm 12. Adjustment of cross member 21 along the length of planar base 12, allows a cut to be made by reference to graduated indicia 18 adjacent the parallel side edges 12c-12c. The extent of the cut is in standardized measurements, e.g. feet and inches. Indicia 18 is graduated along the upper surface 12a of planar arm 12. Further, by sliding the guide fence 21 longitudinally along the arm to a desired point point and securing same, the operator can make a cut of that exact length by utilizing the circular saw transversely to the length of the cut, as explained hereinafter. This securing of the guide fence is achieved by ready manipulation of suitable fasteners 16,16 passing through the fence bottom wall 21a and engageable with the arm undersurface 12a.

Alternately, a narrow cut can be achieved by removing cross member 21 from planar base 12 and adapting cross member 21 directly to the base or sole plate 22 of the circular saw 5. In either configuration, a cut of any practical length can be achieved; the limitation to the length of cut being determined only by the length of the work piece and the power cord attached to the skill saw. The skill saw rip guide works equally well in making cuts in any suitable material, wood, metal or composite plastics and the like.

Structurally, the skill saw rip guide apparatus is made lighter in weight and more practical by providing cavities 19 separated by web 26 transversely disposed across the planar base 12 to lessen fabrication. The materials required in manufacture and fabrication and, as indicated, to reduce the weight of the device without reducing strength. The weight of the planar base 12 stabilizes the saw on the work piece thereby providing to the operator more stability in the work process. Additionally, it will be appreciated that in view of the relatively long length of the arm 12, the web 26 provides a convenient handgrip whereby, the user may grasp the wep 26 with one hand while gripping the saw handle H with the other hand, thus providing ease and stability when carrying the assembly to a work piece.

To use the present guide apparatus, one initially affixes the skill saw S adjacent the end 15' of the arm 12 with the front and rear edges 22a,22b of the saw base or sole plate 22 disposed within the two retention means 14,14' and secured thereto by the fasteners 20,20'. In this position, the blade B of the saw will be seen to be disposed adjacent the arm edge 15'. Then, by utilizing the indicia 18, the operator slides the guide fence 21 longitudinally of the length of the arm 12 to the desired point between its ends 15',12b and secures it in place by tightening the fasteners 16,16. When thusly disposed, the guide surface 21b on the fence 21 will be seen to be disposed below the arm undersurface 12a and defines, with the saw blade B, the width of the intended cut to be made. The user then lowers the assembly over the work piece (not shown) with the fence guide surface 21b aligned with and engaging an edge of the work piece. A true, constant-width cut is accomplished by moving the assembly forward, while maintaining the fence guide surface 21b flushly engaged with the work piece edge during the forward movement of the assembly.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents that may be resorted to, fall within the scope of the invention.

What is claimed is:

1. A work guide for attachment to a portable, power operated skill saw having a blade and a substantially flat base provided with spaced apart front and rear edges comprising, in combination:
   a substantially planar, elongated arm having opposite ends and a pair of side edges;
   means for releasably attaching one said end of said arm to said saw base with the longitudinal axis of said arm extending perpendicular to the plane of said saw blade and on one side thereof, a transversely extending guide fence on said arm;
   mounting means on said guide fence for attaching said guide fence to said arm for sliding movement along the longitudinal axis of said arm;
   said guide fence extending from said arm and including a guide surface for engagement with one edge of a work piece to be cut by said saw;
   means for releasably clamping said guide fence in a selected position along the longitudinal axis of said arm; and
   said arm provided with indicia means for indicating a selected position of said guide fence corresponding to the dimension of the cut to be made in a work piece.

2. A work guide in accordance with claim 1 wherein said releasably attaching means includes:
   oppositely disposed securing means integral with said arm; and
   fasteners releasably securing said saw base relative said securing means and said arm.

3. A work guide in accordance with claim 1 wherein, said releasable clamping means includes mounting means on said guide fence comprising a pair of inwardly directed channels engageable about said arm side edges, and
   fastener means carried by said guide fence and operable to engage said arm.

4. A work guide in accordance with claim 1 including,
   at least one opening in said arm for reducing the weight of said arm.

5. A work guide in accordance with claim 4 wherein a pair of said openings are provided in said arm and, a transversely extending web in said arm between said pair of openings.

* * * * *